3,479,356
5H - DIBENZO [a,d]-CYCLOHEPTATRIENE 10 OR 11-(1,2,3,6-TETRAHYDRO-4-PYRIDYL) AND DERIVATIVES THEREOF
Jean Clement Louis Fouche, Bourg-la-Reine, Hauts-de-Seine, France, assignor to Rhone-Poulenc S.A., Paris, France, a French body corporate
No Drawing. Filed Feb. 1, 1967, Ser. No. 613,096
Claims priority, application France, Feb. 4, 1966, 48,522
Int. Cl. C07d 31/50, 31/28; A61k 27/00
U.S. Cl. 260—253                 8 Claims

ABSTRACT OF THE DISCLOSURE

The invention provides new dibenzo[a,d]cycloheptatrienes carrying a substituted tetrahydro pyridyl residue and their salts. These compounds are active on the central nervous system especially as neuroleptics and tranquilizers and have the valuable pharmacological effects.

---

This invention relates to dibenzo[a,d]cycloheptatriene derivatives and their preparation.

The invention provides the dibenzo[a,d]cycloheptatriene derivatives of the formula:

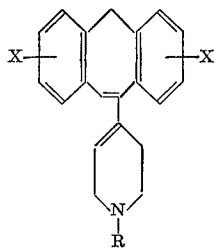

(I)

and their acid addition salts and quaternary ammonium derivatives, in which one of the symbols X represents a hydrogen atom and the other represents hydrogen, halogen, alkyl of 1 to 5 crabon atoms, alkoxy of 1 to 5 carbon atoms, alkylthio of 1 to 5 carbon atoms, or alkanesulphonyl of 1 to 5 carbon atoms, and R represents alkyl of 1 to 5 carbon atoms, alkenyl of 2 to 5 carbon atoms, alkynyl of 2 to 5 carbon atoms, hydroxyalkyl of 1 to 5 carbon atoms, hydroxyalkoxyalkyl of 1 to 5 carbon atoms in each alkyl residue, phenylalkyl of 1 to 5 carbon atoms in the alkyl residue, or phenylalkenyl of 2 to 5 carbon atoms in the alkenyl residue, the phenyl nuclei of the said phenylalkyl and phenylalkenyl groups being unsubstituted or substituted by one or more halogen atoms, or alkyl of 1 to 5 carbon atoms, alkoxy of 1 to 5 carbon atoms, amino, or trifluoromethyl radicals.

The compounds of Formula I are prepared in accordance with a feature of the invention, by reducing a compound of the formula:

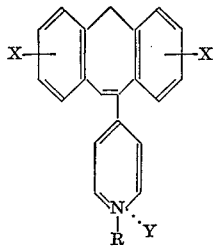

(II)

where R and X are as defined above and Y represents an anion, especially a reactive ester residue, such as a halogen atom or a sulphuric ester residue, and, if desired, converting a dibenzo[a,d]cycloheptatriene base obtained into an acid addition salt or quaternary ammonium derivative thereof. This reduction is best effected with an alkali metal borohydride, preferably potassium borohydride, in aqueous alcoholic medium.

The compounds of Formula II in which Y is a reactive residue can be obtained by quaternisation of compounds of the formula:

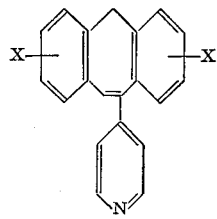

(III)

with a reactive ester of the formula:

Y—R                (IV)

in which —X and —R are as defined above and Y is a reactive ester residue. This quaternisation is effected in an organic solvent at normal temperature or more quickly by heating.

The compounds of Formula III can be obtained by dehydrating the compounds of the formula:

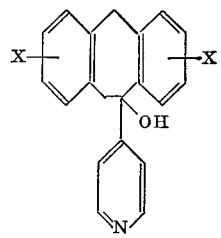

(V)

in which X is as defined above, for example by heating the compound of Formula V in aqueous or aqueous organic medium with a strong acid, or by the action of an acid anhydride in an organic medium.

The compounds of Formula V can be obtained by the action of 4-pyridyl-lithium on the compounds of the formula:

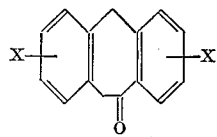

(VI)

in which —X is defined as above, followed by hydrolysis. The initial reaction advantageously takes place in diethyl ether at a temperature of —70° C.

The ketones of Formula VI can be prepared in the following manner:

(a) When one of the symbols X represents a hydrogen or halogen atom or an alkyl, alkoxy or alkylthio radical and the other represents a hydrogen atom, by cyclising substituted phenylacetic acids of the general formula:

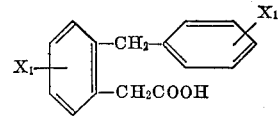

(VII)

in which one of the symbols $X_1$ represents a hydrogen atom and the other represents a hydrogen or halogen atom or an alkyl, alkoxy or alkylthio radical. This cyclisation is advantageously effected by heating the compound of Formula VII in the presence of polyphosphoric acid or its esters, preferably at a temperature between 60° and 180° C.

It is also possible to convert the compounds of Formula VII by conventional methods into the corresponding acid chlorides, and then to cyclise the latter by a Friedel-Crafts reaction, for example, using aluminum chloride in a solvent such as carbon disulphide.

The substituted phenylacetic acids of Formula VII can be prepared from orthobenzyl-benzoic acids of formula:

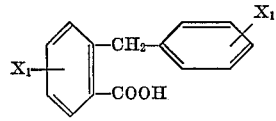

(VIII)

by known methods for converting an acid into its higher homologue.

The acids of Formula VIII are first of all esterified with methyl alcohol and the esters obtained are reduced to give alcohols of the formula:

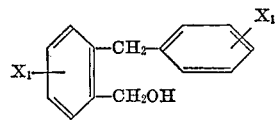

(IX)

in which the symbols —$X_1$ are defined as above.

These alcohols, when treated with a suitable halogenation agent, particularly by a chlorination agent such as, for example, thionyl chloride, give the halides of the formula:

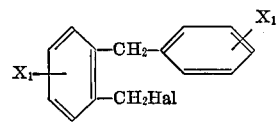

(X)

in which Hal represents a halogen atom, especially a chlorine or bromine atom. By the action of an alkali metal cyanide, the halides of Formula X are converted into the nitriles of the formula:

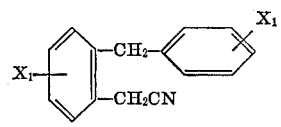

(XI)

the hydrolysis of which leads to the acids of Formula VII.

(b) When one of the symbols X represents an alkanesulphonyl radical and the other represents a hydrogen atom, by oxidising the corresponding compound of Formula VI in which one of the symbols X represents an alkylthio radical and the other represents a hydrogen atom.

The starting acids of Formula VIII can be prepared by methods known per se. For example, phthalic anhydride or a substituted phthalic anhydride can be caused to react, under the conditions of the Friedel-Crafts reaction, with a compound of the formula:

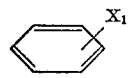

(XII)

in which $X_1$ is as defined above, to produce an ortho-aroylbenzoic acid of formula:

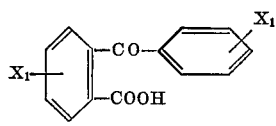

(XIII)

and then the latter can be reduced to give the desired acid of Formula VIII. This reduction can be effected by methods known per se, for example, with hydrogen in the presence of a hydrogenation catalyst, such as palladium or by the action of a reducing agent such as zinc in an ammoniacal medium.

The acids of Formula VIII can also be prepared by reduction of phthalides of the formula:

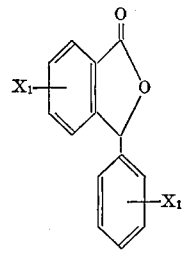

(XIV)

in which the symbols $X_1$ are as defined above. This reduction can be effected, for example, with zinc in an ammoniacal medium. The phthalides of Formula XIV can themselves be prepared by the reaction:

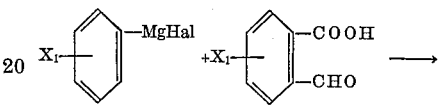

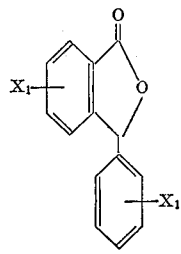

the symbols $X_1$ being as defined above.

The compounds of Formula I may optionally be purified by physical methods (such as distillation, crystallisation, or chromatography) or chemical methods (such as salt formation and crystallisation of these salts, followed by decomposition in an alkaline medium). In these operations, the nature of the anion of the salt is immaterial, the only condition being that the salt should be well defined and easily crystallisable.

The new compounds can be converted into acid addition salts and into quaternary ammonium derivatives.

The acid addition salts can be obtained by reaction of the bases with acids in suitable solvents. Organic solvents which may be used are, for example, alcohols, ethers, ketones or chlorinated solvents. The salt formed precipitates, sometimes after concentration of the solution, and is separated by filtration or decantation. The quaternary ammonium derivatives can be obtained by reaction of the bases with esters, optionally in an organic solvent, at ordinary temperature or, more quickly, by gentle heating.

The new compounds both as bases and as their acid addition salts and quaternary ammonium derivatives, have interesting pharmacodynamic properties. In particular, they are very active on the central nervous system as neuroleptics and tranquillisers. They have good antihistaminic, antiserotoninic and antiemetic activity, and are also active as analgesics and antiparkinsonin agents. They have given good results in physiological tests on animals in doses of 0.15 to 50 mg. per kg. of animal weight, administered orally.

Of the compounds of Formula I, those of the formula:

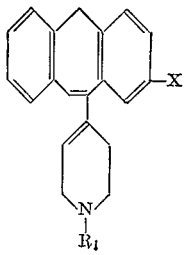

in which X represents hydrogen, halogen, alkyl of 1 to 5 carbon atoms, alkoxy of 1 to 5 carbon atoms, alkylthio of 1 to 5 carbon atoms, or alkanesulphonyl of 1 to 5 carbon atoms, and $R_1$ represents alkyl of 1 to 5 carbon atoms or phenylalkyl of 1 to 5 carbon atoms in the alkyl residue, the phenyl nucleus of the said phenylalkyl radical being unsubstituted or substituted by one or more halogen atoms, or alkyl of 1 to 5 carbon atoms, alkoxy of 1 to 5 carbon atoms, amino, or trifluoromethyl radicals, are especially valuable. Particularly preferred are the compounds in which X represents hydrogen, chlorine, bromine or alkylthio of 1 to 5 carbon atoms, and $R_1$ represents methyl, benzyl, or 4-alkoxy-benzyl of 1 to 5 carbon atoms in the alkoxy residue (especially para-methoxybenzyl), and especially:

2-chloro-11-(1-methyl-1,2,3,6-tetrahydro-4-pyridyl)-dibenzo[a,d]cycloheptatriene,
10-[1-(4-methoxybenzyl)-1,2,3,6-tetrahydro-4-pyridyl]-dibenzo[a,d]cycloheptatriene;
2-methylthio-11-(1-methyl-1,2,3,6-tetrahydro-4-pyridyl)-dibenzo[a,d]cycloheptatriene;
2-bromo-11-(1-methyl-1,2,3,6-tetrahydro-4-pyridyl)-dibenzo[a,d]cycloheptatriene;
2-chloro-11-(1-benzyl-1,2,3,6-tetrahydro-4-pyridyl)-dibenzo[a,d]cycloheptatriene and their acid addition salts and quaternary ammonium derivatives.

For theropeutic purposes, the compounds of Formula I are employed either as the base or, when appropriate, as non-toxic acid addition salts or quaternary ammonium derivatives, that is to say, salts and derivatives the anions of which are non-toxic in the doses used, so that the beneficial physiological effects inherent in the bases are not vitiated by side effects ascribable to the anions. Examples of suitable non-toxic acid addition salts include salts with mineral acids, such as the hydrochlorides, sulphates, nitrates, and phosphates, and with organic salts, such as the acetates, propionates, succinates, benzoates, fumarates, maleates, theophylline-acetates, salicylates, phenolphthalinates, and methylene-bis-β-hydroxynaphthoates as well as substituted derivatives of these acids. Examples of suitable non-toxic quaternary ammonium derivatives include the derivatives formed with mineral or organic esters, such as methyl, ethyl, allyl and benzyl chloride, bromide and iodide, dimethyl and diethyl sulphate and methyl and ethyl benzene-sulphonate as well as substituted derivatives of these esters.

The following examples illustrate the invention. The nomenclature of the compounds named in the examples is based on the following numbering system:

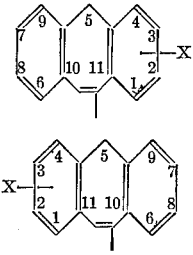

EXAMPLE 1

To a solution of 11 g. of 1-methyl-4-(dibenzo[a,d]cycloheptatrien-10-yl)-pyridinium bromide in 260 cc. of methanol, a solution of 7.65 g. of potassium borohydride in 65 cc. of distilled water is added in 25 minutes. The reaction mixture is stirred at ambient temperature for 4 hours, then treated with 200 cc. of distilled water, and kept at 5° C. for 90 minutes. The crystals which appear are separated, washed with 40 cc. of a mixture of water and methanol (in equal volumes), then twice with distilled water (100 cc. altogether), and finally dried under reduced pressure (20 mm. Hg). The product obtained (7.9 g.; M.P.=130–131° C.) is dissolved in 32 cc. of boiling acetonitrile. After cooling for 4 hours to 3° C., the crystals which have appeared are separated, washed twice with ice-cold acetonitrile (8 cc. in all), and dried under reduced pressure (20 mm. Hg). 7 g. of 10-(1-methyl - 1,2,3,6 - tetrahydro - 4 - pyridyl)dibenzo[a,d]cycloheptatriene, M.P. 130–131° C., are obtained.

The 1-methyl - 4 - (dibenzo[a,d]cycloheptatrien-10-yl)pyridinium bromide used as starting material can be obtained in the following manner: 10-oxo-dibenzo[a,d]cycloheptadiene is obtained by the method of Leonard et al. J. Amer. Chem. Soc. 77, 5081 (1955). 34.5 g .of 10-hydroxy - 10 - (4 - pyridyl)dibenzo[a,d]cycloheptadiene (M.P. 218° C.) are prepared by the action of 4-pyridyl-lithium (prepared from 126 g. of 4-bromo-pyridine) on 83.2 g. of 10 - oxo - dibenzo[a,d]cycloheptadiene in diethyl ether at −70° C. 7.7 g. of 10-(4-pyridyl)-dibenzo[a,d]cycloheptatriene (M.P. 134–135° C.) are prepared by the action of 80 cc. of an aqueous solution of 2 N methanesulphonic acid on 10.2 g. of 10-hydroxy-10-(4-pyridyl)-dibenzo[a,d]cycloheptadiene under reflux for 72 hours. 17.8 g. of 1-methyl-4-(dibenzo[a,d]cycloheptatrien-10-yl)-pyridinium bromide, (M.P. 230–235° C.) are prepared by the action of 55 g. of methyl bromide in solution in 60 cc. of acetonitrile on 13.2 g. of 10-(4-pyridyl)-dibenzo[a,d]cycloheptatriene for 3 hours at 80° C.

EXAMPLE 2

To a solution of 8.9 g. of 1-methyl-4-(2-chlorodibenzo[a,d]cycloheptatrien-11-yl)pyridinium bromide in 150 cc. of methanol, a solution of 6 g. of potassium borohydride in 35 cc. of distilled water is added in 30 minutes. The reaction mixture is stirred at ambient temperature for 5 hours, then treated with 150 cc. of distilled water, and kept at 5° C. for 2 hours. The crystals which appear are separated, washed twice with a total of 100 cc. of distilled water, and dried under reduced pressure (20 mm. Hg). The product obtained (6.3 g., M.P.=102–103° C.) is treated with 70 cc. of distilled water, 20 cc. of an aqueous solution of 2 N methanesulphonic acid, and 70 cc. of diethyl ether. The aqueous solution is separated and made alkaline with 25 cc. of 10 N caustic soda solution. The oil which separates out is extracted twice with a total of 240 cc. of diethyl ether. The combined ethereal solutions are dried over anhydrous potassium carbonate and evaporated. The residue obtained (6.15 g.) is dissolved in 22 cc. of boiling diisopropyl ether. After cooling for 17 hours at 3° C. the crystals which have appeared are separated, washed twice with a total of 6 cc. of ice-cold diisopropyl ether, and dried under reduced pressure (20 mm. Hg). 5.2 g. of 2-chloro-11 - (1 - methyl - 1,2,3,6-tetrahydro-4-pyridyl)dibenzo[a,d]cycloheptatriene are obtained, M.P. 103–104° C.

The 1 - methyl - 4 - (2 - chlorodibenzo[a,d]cycloheptatrien-11-yl)-pyridinium bromide starting material is prepared in the following manner. Methyl 2-(4-chlorobenzyl)-benzoate, B.P. 170–175° C./0.3 mm. Hg, is prepared by esterification of the corresponding acid. This ester is reduced to 2-(4-chlorobenzyl)-benzyl alcohol, B.P. 180–184° C./0.35 mm. Hg, by the action of lithium aluminum hydride in tetrahydrofuran. This alcohol is converted into the bromide, by treatment with hydrogen bromide. The 2-(4-chlorobenzyl)-benzyl bromide obtained melts at 58° C. 2-(4-chlorobenzyl)-phenylacetonitrile, B.P. 168–170° C./0.3 mm. Hg, is prepared by reaction of this bromide with potassium cyanide. Hydrolysis of the nitrile gives 2-(4-chlorobenzyl)-phenylacetic acid, M.P. 140° C. This acid is cyclised by heating with a mixture of orthophosphoric acid and anhydride, thus giving 2-chloro-11-oxo - dibenzo[a,d]cycloheptadiene, M.P. 104° C. 37.2 g. of 2-chloro-11-hydroxy-11-(4-pyridyl)dibenzo[a,d]cycloheptadiene (M.P. 238° C.) are prepared by the action of 4-pyridyl-lithium (prepared from 111 g. of 4-bromo-pyridine) on 85 g. of 2-chloro-11-oxo-dibenzo[a,d]cycloheptadiene. 5.6 g. of 2-chloro-11-(4-pyridyl)-dibenzo[a,d]cycloheptatriene (M.P.=184–

185° C.) are prepared by the action of acetic anhydride on 7 g. of 2-chloro-11-hydroxy-11-(4-pyridyl)-dibenzo[a,d]cycloheptadiene, in acetic acid in the presence of perchloric acid. 7.1 g. of 1-methyl-4-(2-chloro-dibenzo[a,d]cycloheptatrien-11-yl)pyridinium bromide (M.P.=220–230° C.) is prepared by the action of 30 g. of methyl bromide, in solution in 30 cc. of acetonitrile, on 5.5 g. of 2-chloro-11-(4-pyridyl)dibenzo[a,d]cycloheptatriene for 4 hours at 80° C.

EXAMPLE 3

To a solution of 11 g. of 1-ethyl-4-(dibenzo[a,d]cycloheptatrien-10-yl)pyridinium bromide in 260 cc. of methanol, a solution of 7.7 g. of potassium borohydride in 65 cc. of distilled water is added in 1 hours. The reaction mixture is stirred at ambient temperature for 3 hours, then treated with 200 cc. of distilled water, and cooled to 5° C. during 90 minutes. The crystals which have appeared are separated, washed with 40 cc. of a water-methanol mixture (in equal volumes), then twice with a total of 100 cc. of distilled water, and finally dried under reduced pressure (20 mm. Hg). The product obtained (8.2 g.), M.P. about 55–60° C., is dissolved in 70 cc. of anhydrous acetone. 14 cc. of a solution of hydrogen chloride in anhydrous diethyl ether (containing 2 mols of hydrogen chloride per litre of solution) are added and the mixture is cooled in ice-cold water. The crystals which form are separated, washed with 15 cc. of acetone and then with 10 cc. of diethyl ether. 8.4 g. of hydrochloride melting at about 260–265° C. are obtained. An aqueous solution of the hydrochloride is made alkaline by addition of dilute sodium hydroxide solution and the base liberated is extracted with diethyl ether. 7.4 g. of base are thus obtained, the maleate of which is prepared by the action of 3.8 g. of maleic acid in solution in 100 cc. of isopropanol. After cooling in ice-cold water, separation, and washing with 15 cc. of isopropanol, 9.4 g. of the acid maleate of 10-(1-ethyl-1,2,3,6-tetrahydro-4-pyridyl)dibenzo[a,d]cycloheptatriene, M.P. 148–150° C., are obtained.

11.4 g. of 1-ethyl-4-(dibenzo[a,d]cycloheptatrien-10-yl pyridinium bromide (M.P.=170–172° C.) used as starting material are prepared by the action of 9.8 g. of ethyl bromide, in solution in 45 cc. of acetonitrile, on 8.1 g. of 10-(4-pyridyl)dibenzo[a,d]cycloheptatriene for 24 hours at 80° C. The 10-(4-pyridyl)-dibenzo[a,d]cycloheptatriene is prepared in the manner described in Example 1.

EXAMPLE 4

By operating as in Example 3, but starting with 11.2 g. of 1-propyl-4-(dibenzo[a,d]cycloheptatrien-10-yl)pyridinium bromide and 7.7 g. of potassium borohydride, 9 g. of a base are obtained. By the action of 3.8 g. of maleic acid in solution in 100 cc. of isopropanol, 12.3 g. of the acid maleate of 10-(1-propyl-1,2,3,6-tetrahydro-4-pyridyl)-dibenzo[a,d]cycloheptatriene, M.P. 124–126° C., are obtained.

11.3 g. of 1-propyl-4-(dibenzo[a,d]cycloheptatrien-10-yl)pyridinium bromide (M.P.=275–280° C.) are prepared by heating 8.1 g. of 10-(4-pyridyl)-dibenzo[a,d,]cycloheptatriene at 80° C. for 26 hours with 11 g. of propyl bromide in solution in 45 cc. of acetonitrile.

EXAMPLE 5

By operating as in Example 3, but starting with 5.2 g. of 1-(2-hydroxyethyl)-4-(dibenzo[a,d]cycloheptatrien-10-yl)pyridinium chloride and 3.9 g. of potassium borohydride, 4.8 g. of a base are obtained. By the action of 2 g. of maleic acid in solution in 50 cc. of isopropanol, 5.2 g. of the acid maleate of 10-[1-(2-hydroxyethyl)-1,2,3,6-tetrahydro-4-pyridyl]dibenzo[a,d]cycloheptatriene, M.P. 120–122° C., are obtained.

5.2 g. of 1-(2-hydroxyethyl)-4-(dibenzo[a,d]cycloheptatrien-10-yl)pyridinium chloride (M.P.=248–252° C.) are prepared by heating under reflux for 24 hours 8.1 g. of 10-(4-pyridyl)-dibenzo[a,d]cycloheptatriene with 7.2 g. of ethylene glycol chlorhydrin in solution in 45 cc. of acetonitrile.

EXAMPLE 6

By operating as in Example 3, but starting with 8.1 g. of 1-allyl-4-(dibenzo[a,d]cycloheptatrien-10-yl)pyridinium chloride and 7.7 g. of potassium borohydride, 8.3 g. of a base are obtained. By action of 3.8 g. of maleic acid in solution in 100 cc. of isopropanol, 8.6 g. of the acid maleate of 10-(1-allyl-1,2,3,6-tetrahydro-4-pyridyl)dibenzo[a,d]cycloheptatriene, M.P. 148–150° C., are obtained.

9.5 g. of 1-allyl-4-(dibenzo[a,d]cycloheptatrien-10-yl)pyridinium chloride (M.P.=254–256° C.) are prepared by action of 6.9 g. of allyl chloride, in solution in 45 cc. of acetonitrile, on 8.1 g. of 10-(4-pyridyl)dibenzo[a,d]cycloheptatriene for 24 hours at 80° C.

EXAMPLE 7

By operating as in Example 3, but starting with 9.2 g. of 1-(2'-hydroxy-2-ethoxyethyl)-4-(dibenzo[a,d]cycloheptatrien-10-yl)pyridinium chloride (as a resin containing 73% of the theoretical amount of chlorine) and 7.7 g. of potassium borohydride, 5.8 g. of a base are obtained. This is dissolved in a mixture of 40 cc. of benzene and 160 cc. of cyclohexane, and purified by chromatography on 100 g. of aluminum oxide. By elution, first 2 g. of solid and then 3.1 g. of a viscous oil are obtained. The oil is dissolved in 15 cc. of isopropanol, and 1.4 g. of fumaric acid in solution in 20 cc. of ethanol are added. 2.8 g. of the acid fumarate of 10-[1-(2'-hydroxy-2-ethoxyethyl)-1,2,3,6-tetrahydro-4-pyridyl]dibenzo[a,d]cycloheptatriene, M.P. 126–128° C., are obtained.

The 1-(2'-hydroxy-2-ethoxyethyl)-4-(dibenzo[a,d]cycloheptatrien-10-yl)pyridinium chloride used as starting material is prepared by heating under reflux for 24 hours 12.1 g. of 10-(4-pyridyl)dibenzo[a,d]cycloheptatriene with 14.3 g. of 2'-hydroxy-2-ethoxyethyl chloride in solution in 50 cc. of acetonitrile. After cooling, 3.3 g. of unreacted starting material are separated by filtration.

By concentration of the filtrate, 9.2 g. of 1-(2'-hydroxy-2-ethoxyethyl)-4-(dibenzo[a,d]cycloheptatrien-10-yl)pyridinium chloride are obtained as a resin containing 73% of the theoretical amount of chlorine.

EXAMPLE 8

By operating as in Example 3, but starting with 12.4 g. of 1-(4-methoxybenzyl)-4-(dibenzo[a,d]cycloheptatrien-10-yl)pyridinium chloride and 7.7 g. of potassium borohydride, 10.8 g. of a base are obtained. This is recrystallised from 50 cc. of diisopropyl ether and 8.7 g. of 10-[1-(4-methoxybenzyl)-1,2,3,6-tetrahydro-4-pyridyl]dibenzo[a,d]cycloheptatriene, M.P. 108–110° C., are obtained.

12.4 g. of 1-(4-methoxybenzyl)-4-(dibenzo[a,d]cycloheptatrien-10-yl)pyridinium chloride (M.P. 246–248° C.) are prepared by the action of 0.4 g. of 4-methoxybenzyl chloride, in solution in 45 cc. of acetonitrile, on 8.1 g. of 10-(4-pyridyl)dibenzo[a,d]cycloheptatriene under reflux for 32 hours.

EXAMPLE 9

To a solution of 8.2 g. of methyl-4-(2-methylthio-dibenzo[a,d]cycloheptatrien-11-yl)pyridinium bromide in 160 cc. of methanol, a solution of 5.4 g. of potassium borohydride in 40 cc. of distilled water is added in 30 minutes. The reaction mixture is stirred at ambient temperature for 4 hours, then treated with 160 cc. of distilled water, and kept at 5° C. for 2 hours. The crystals which have appeared are separated, washed 8 times with a total of 40 cc. of distilled water, and dried under reduced pressure (20 mm. Hg). The product obtained (6.5 g., M.P. about 103° C.) is dissolved in 160 cc. of 2 N methanesulphonic acid and the acid solution is washed with 100 cc. of diethyl ether. The acid solution is made alkaline and extracted with ether. 6.1 g. of base are obtained by evaporation of the ethereal extract. After recrystallisation from 20 cc. of diisopropyl ether, 5.6 g. of 2 - methylthio - 11 - (1 - methyl - 1,2,3,6 - tetrahydro-4-pyridyl)dibenzo[a,d]cycloheptatriene, M.P. 102–104° C., are obtained.

The 1-methyl-4-(2-methylthio-dibenzo[a,d]cycloheptatrien-11-yl)pyridinium bromide used as starting material can be prepared in the following manner: 16.5 g. of 2-methylthio - 11 - (4 - pyridyl) - dibenzo[a,d]cycloheptatriene (M.P.=177–179° C.) are prepared by the action of a mixture of acetic anhydride and perchloric acid in acetic acid on 20.0 g. of 2-methylthio-11-hydroxy-11-(4-pyridyl)dibenzo[a,d]cycloheptadiene. 9.6 g. of 1-methyl-4 - (2-methylthio - dibenzo[a,d]cycloheptatrien - 11 - yl) pyridinium bromide (M.P.=245–249° C.) are prepared by the action of an excess of methyl bromide on 8.0 g. of 2 - methylthio - 11 - (4 - pyridyl) - dibenzo[a,d]cycloheptatriene in acetonitrile at 80° C. 2-Methylthio-11-hydroxy-11 - (4-pyridyl)dibenzo[a,d]cycloheptadiene, M.P. 244–245° C., can be prepared by the action of 4-pyridyl-lithium (prepared from 4-bromopyridine) on 2-methylthio-11-oxo - dibenzo[a,d]cycloheptadiene in diethyl ether at −70° C.

The 2-methylthio-11-oxo-dibenzo[a,d]cycloheptadiene can itself be prepared by the following intermediate stages:

2-(4-methylthiobenzyl)benzoic acid, M.P. 129° C.;
2-(4-methylthiobenzyl)methyl benzoate;
2-(4-methylthiobenzyl)benzyl alcohol, M.P. 70° C.;
2-(4-methylthiobenzyl)benzyl chloride;
2-(4-methylthiobenzyl)phenylacetonitrile, M.P. 75–76° C.; and
2-(4-methylthiobenzyl)phenylacetic acid, M.P. 138° C.

The latter is cyclised to give 2-methylthio-11-oxo-dibenzo-[a,d]cycloheptadiene, M.P. 104° C., by heating in the presence of a mixture of orthophosphoric acid and phosphoric anhydride.

EXAMPLE 10

By operating as in Example 9, but starting with 7.75 g. of 1 - methyl - 4 - (2 - bromo - dibenzo[a,d]cycloheptatrien-11-yl)pyridinium bromide and 4.75 g. of potassium borohydride, 5.9 g. of 2-bromo-11-(1-methyl-1,2,3,6 - tetrahydro - 4 - pyridyl)dibenzo[a,d]cycloheptatriene, M.P. 100–104° C., are obtained after recrystallisation from diisopropyl ether.

The 1 - methyl - 4 - (2 - bromo - dibenzo[a,d]cycloheptatrien-11-yl)-pyridinium bromide can be prepared in the following manner: 17.6 g. of 2-bromo-11-(4-pyridyl) dibenzo[a,d]cycloheptatriene (M.P. 202–204° C.) is prepared as in Example 9, but starting with 20.1 g. of 2-bromo - 11 - hydroxy - 11 - (4 - pyridyl) dibenzo[a,d] cycloheptadiene. 20.2 g. of 1-methyl-4-(2-bromo-dibenzo [a,d]cycloheptatrien-11-yl)pyridinium bromide (M.P. 270° C.) is prepared as in Example 9, but starting with 17.4 g. of 2-bromo-11-(4-pyridyl)dibenzo[a,d]cycloheptatriene. 2-Bromo - 11 - hydroxy - 11 - (4 - pyridyl) dibenzo[a,d]cycloheptadiene, M.P. 263° C., can be prepared by action of 4-pyridyl-lithium (prepared from 4-bromopyridine) on 2-bromo-11-oxo-dibenzo[a,d]cycloheptadiene in diethyl ether at −70° C.

The 2 - bromo - 11 - oxo - dibenzo[a,d]cycloheptadiene can itself be prepared by the following intermediate stages:

methyl 2-(4-bromobenzyl)benzoate, M.P. 56° C.;
2-(4-bromobenzyl)benzyl alcohol, B.P. 165–167° C./0.2 mm. Hg;
2-(4-bromobenzyl)benzyl bromide, M.P. 72° C.;
2-(4-bromobenzyl)phenylacetonitrile, B.P. 175–178° C./0.5 mm. Hg;
2-(4-bromobenzyl) phenylacetic acid, M.P. 166° C.;

the last is cyclised into 2-bromo-11-oxo-dibenzo[a,d]cycloheptadiene, M.P. 106° C., by heating in the presence of orthophosphoric acid and phosphoric anhydride.

EXAMPLE 11

By operating as in Example 9, but starting with 7.3 g. of 1 - methyl - 4 - (2 - methoxy - dibenzo[a,d]cycloheptatrien-11-yl)pyridinium bromide and 5 g. of potassium borohydride, 5.4 g. of base are obtained, the methanesulphonate of which is prepared in ethanol. By addition of diethyl ether, filtration and drying, 5.9 g. of 2-methoxy - 11 - [1 - methyl - 1,2,3,6 - tetrahydro - 4 - pyridyl] dibenzo[a,d]cycloheptatriene methane-sulphonate M.P. 172–174° C., are obtained.

The initial 1-methyl-4-(2-methoxy-dibenzo[a,d]cycloheptatrien-11-yl)pyridinium bromide can be prepared in the following manner: 13.5 g. of 2-methoxy-11-(4-pyridyl)dibenzo[a,d]cycloheptatriene, M.P. 196–197° C., are prepared by the action of the mixture of acetic anhydride and perchloric acid in acetic acid on 15.6 g. of 2-methoxy - 11 - hydroxy - 11 - (4 - pyridyl)dibenzo[a,d] cycloheptadiene. 16.3 g. of 1-methyl-4-(2-methoxy-dibenzo[a,d]cycloheptatriene - 11 - yl)pyridinium bromide (M.P. 263–267° C.) are prepared by the action of an excess of methyl bromide on 13.2 g. of 2-methoxy-11-(4-pyridyl)dibenzo[a,d]cycloheptatriene in acetonitrile at 80° C.

The 2 - methoxy - 11 - hydroxy - 11 - (4 - pyridyl) dibenzo[a,d]cycloheptadiene, M.P. 226° C., used in this preparation can be prepared by the action of 4-pyridyl-lithium (prepared from 4-bromopyridine) on 2-methoxy-11-oxo-dibenzo[a,d]cycloheptadiene in diethyl ether at −70° C.

The 2 - methoxy - 11 - oxo - dibenzo[a,d]cycloheptadiene can itself be prepared by the following intermediate stages:

2-(4-methoxybenzyl)benzoic acid is prepared by the method of Lin-Che-Kin, Ann. Chem. 13, 317 (1940);
2-(4-methoxybenzoyl)benzoic acid, M.P. 111–112° C.;
methyl 2-(4-methoxybenzyl)benzoate, B.P. 150–160° C./0.3 mm. Hg;
2-(4-methoxybenzyl)benzyl alcohol, B.P. 170–180° C./0.2 mm. Hg;
2-(4-methoxybenzyl)benzyl chloride, B.P. 150–158° C./0.7 mm. Hg;
2 - (4 - methoxybenzyl)phenylacetonitrile, M.P. 65° C.; and
2-(4-methoxybenzyl)phenylacetic acid, M.P. 70° C., which is cyclised into 2-methoxy-11-oxo-dibenzo[a,d]cycloheptadiene, M.P. 82–84° C., by the action of a mixture of orthophosphoric acid and phosphoric anhydride.

EXAMPLE 12

By operating as in Example 9, but starting with 7.4 g. of 1 - benzyl - 4 - (2-chlorodibenzo[a,d]cycloheptatrien-11-yl)pyridinium bromide and 4.32 g. of potassium borohydride, 6 g. of 2-chloro-11-(1-benzyl-1,2,3,6-tetrahydro-4-pyridyl)dibenzo[a,d]cycloheptatriene, M.P. 173–175° C., are obtained, after recrystallisation from ethyl acetate.

17.9 g. of the starting 1-benzyl-4(2-chloro-dibenzo-[a,d]cycloheptatrien-11-yl)pyridinium bromide (M.P.=266–268° C.)

are prepared by the action of 9.5 g. of benzyl bromide on 12.15 g. of 2 - chloro - 11-(4-pyridyl)-dibenzo[a,d]cycloheptatriene in acetonitrile under reflux for 7 hours. The 2 - chloro - 11 - (4 - pyridyl)dibenzo[a,d]cycloheptatriene is prepared as described in Example 2.

EXAMPLE 13

By operating as in Example 9, but starting with 7 g. of 1 - (4 - methoxybenzyl) -4 - (2 - chloro-dibenzo-[a,d]cycloheptatrien-11-yl)pyridinium bromide and 3.8 g. of potassium borohydride, 6 g. of base are obtained. By the action of 4 cc. of a solution of hydrogen chloride in anhydrous diethyl ether (containing 4.6 mols of hydrogen chloride per litre of solution), 6.8 g. of 2-chloro-11-[1-(4 - methoxybenzyl) - 1,2,3,6 - tetrahydro - 4 - pyridyl]-dibenzo[a,d]cycloheptatriene hydrochloride, M.P. 190° C., are obtained.

19.2 g. of 1-(4-methoxybenzyl)-4-(2-chloro-dibenzo-[a,d]cycloheptatrien-11-yl)pyridinium bromide (M.P.=263–265° C.)

are obtained by the action of 11.2 g. of 4-methoxybenzyl bromide on 12.15 g. of 2-chloro-11-(4-pyridyl)dibenzo-[a,d]cycloheptatriene in acetonitrile under reflux for 7 hours.

EXAMPLE 14

By operating as in Example 9, but starting with 8.5 g. of 1 - methyl - 4 - (3 - chloro-dibenzo[a,d]cyclohepta-trien-11-yl)pyridinium bromide and 5.75 g. of potassium borohydride, 5.4 g. of 3-chloro-11-(1-methyl-1,2,3,6-tetrahydro - 4 - pyridyl)dibenzo[a,d]cycloheptatriene, M.P. 124° C., are obtained, after recrystallisation from acetonitrile.

The initial 1-methyl-4-(3-chloro-dibenzo[a,d]cyclohep-tatrien-11-yl)pyridinium bromide can be prepared in the following manner: 11.6 g. of 3-chloro-11-(4-pyridyl)di-benzo[a,d]cycloheptatriene (M.P. 170° C.) are prepared as in Example 9, but starting with 14.9 g. of 3-chloro-11 - hydroxy - 11 - (4 - pyridyl)dibenzo[a,d]cyclohepta-diene, 13.2 g. of 1-methyl-4-(3-chloro-dibenzo[a,d]cy-cloheptatrien-11-yl)pyridinium bromide, (M.P. 236° C.) are prepared by the action of 18 g. of methyl bromide, in solution in 30 cc. of acetonitrile, on 11.5 g. of 3-chloro-11 - (4 - pyridyl)dibenzo[a,d]cycloheptatriene for 4½ hours at 80° C.

18 g. of 3-chloro-11-hydroxy-11-(4-pyridyl)dibenzo-[a,d]cycloheptadiene (M.P. 258° C.) are prepared by the action of 4-pyridyl-lithium (prepared from 35.5 g. of 4-bromopyridine) on 27.3 g. of 3-chloro-11-oxo-dibenzo-[a,d]cycloheptadiene.

The 3-chloro-11-oxo-dibenzo[a,d]cycloheptadiene can itself be prepared in the following manner: 381 g. of 2-(3-chlorobenzoyl)-benzoic acid (M.P. 160° C.) are prepared by the action of 3-chlorophenyl magnesium bromide on 254 g. of phthalic anhydride in a mixture of diethyl ether and benzene. 215.5 g. of 2-(3-chlorobenzyl)benzoic acid (M.P. 105° C.) are prepared by reduction of 251 g. of 2-(3-chlorobenzoyl)benzoic acid with powdered zinc in ammonia. 272.3 g. of methyl 2-(3-chloro-benzyl)benzoate (B.P. 149–150° C./0.25 mm. Hg) are prepared by the action of methanol under reflux in the presence of sulphuric acid on 272 g. of 2-(3-chloro-benzyl)benzoic acid. 195.5 g. of 2-(3-chlorobenzyl) benzyl alcohol (B.P. 162–164° C./0.3 mm. Hg) are prepared by reduction with lithium aluminum hydride in anhydrous tetrahydrofuran of 272 g. of methyl 2-(3-chloro-benzyl)benzoate. 246 g. of 2-(3-chlorobenzyl)benzyl bromide (crude oily product) are prepared by the action of 48% aqueous hydrobromic acid under reflux on 195 g. of 2-(3-chlorobenzyl)benzyl alcohol. 197.5 g. of 2-(3-chlorobenzyl)phenylacetonitrile (M.P. 56–57° C.) are prepared by the action of potassium cyanide in aqueous ethanol reflux on 246 g. of 2-(3-chlorobenzyl)benzyl bromide. 181.4 g. of 2-(3-chlorobenzyl)phenylacetic acid (M.P. 87–88° C.) are prepared by hydrolysis, in aqueous ethanol under reflux in the presence of potassium hydroxide, of 181 g. of 2-(3-chlorobenzyl)phenylacetonitrile. 91.6 g. of 3-chloro-11-oxo-dibenzo[a,b]cyclohepta-diene (M.P. 130° C.) are prepared by heating 167 g. of 2-(3-chlorobenzyl)phenylacetic acid for 5 hours at 135° C. in polyphosphoric acid.

The present invention includes within its scope pharmaceutical compositions which comprise at least one of the compounds of Formula I or non-toxic acid addition salt or quaternary ammonium derivative thereof, in association with a pharmaceutically acceptable carrier or coating. Such compositions will ordinarily be in a form suitable for oral, parenteral or rectal administration.

Solid compositions for oral administration include compresesd tablets, pills, powders and granules. In such solid compositions, one or more of the active compounds is, or are, mixed with one or more inert diluents, such as sucrose, lactose or starch. The compositions may also comprise as is normal practice, susbtances other than inert diluents, for example lubricating agents, such as magnesium stearate.

Liquid compositions for oral administration include pharmaceutically acceptable emulsions, solutions, suspensions, syrups and elixirs containing inert diluents commonly used in the art such as water or liquid paraffin. These compositions can also comprise substances other than inert diluents, for example wetting and suspending agents, and sweetening, flavouring, perfuming and preserving agents.

The compositions of the invention for oral administration also include capsules of asorbable material such as gelatin containing one or more of the active substances with or without the addition of diluents or excipients.

Preparations according to the invention for parenteral administration include sterile aqueous or non-aqueous solutions, suspensions or emulsions. Examples of non-aqueous solvents or suspending media are propylene glycol, polyethylene glycol, vegetable oils, such as olive oil, and the injectable organic esters such as ethyl oleate. These compositions may also contain adjuvants such as preserving, wetting, emulsifying, and dispersing agents. They may be sterilised for example, by filtration through a bacteriological filter, by incorporation in the compositions of sterilising agent, by irradiation, or by heating. They can also be prepared in the form of sterile solid compositions, which can be dissolved immediately before use in sterile water or any other sterile injectable medium.

Compositions for rectal administration are suppositories which contain in addition to the active substance, excipients such as cocoa butter or a suitable suppository wax base.

The percentage of active ingredient in the compositions of the invention may be varied, it being necessary that it should constitute a proportion such that a suitable dosage shall be obtained. Ordinarily a concentration of 1% to 95% by weight of active material is satisfactory. The doses used depend on the desired therapeutic effect, the method of administration and the duration of the treatment. Given orally the new compounds are generally administered in a dose of from 0.5 mg. to 500 mg. of active product per day for an adult.

The following examples exemplify pharmaceutical compositions in accordance with the invention.

EXAMPLE 15

Using the usual procedure, tablets are prepared which have the following compositions:

| | Mg. |
|---|---|
| 2-chloro - 11 - (1-methyl - 1,2,3,6 - tetrahydro-4-pyridyl)dibenzo[a,d]cycloheptatriene | 2.5 |
| Starch | 110 |
| Colloidal silica | 35 |
| Magnesium stearate | 2.5 |

EXAMPLE 16

Using the usual procedure, tablets are prepared which have the following composition:

| | Mg. |
|---|---|
| 2-methylthio - 11 - (1-methyl-1,2,3,6-tetrahydro-4-pyridyl)dibenzo[a,d]cycloheptatriene | 2.5 |
| Starch | 110 |
| Colloidal silica | 35 |
| Magnesium stearate | 2.5 |

I claim:
1. A dibenzo[a,d]cycloheptatriene of the formula:

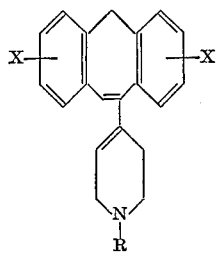

and its therapeutically acceptable acid addition salts, in which one of the symbols X represents a hydrogen atom and the other represents hydrogen, halogen, alkoxy of 1 to 5 carbon atoms, or alkylthio of 1 to 5 carbon atoms, and R represents alkyl of 1 to 5 carbon atoms, allyl, hydroxyalkyl of 1 to 5 carbon atoms, hydroxyalkoxyalkyl of 1 to 5 carbon atoms in each alkyl residue, or benzyl, the phenyl nucleous of which is unsubstituted or substituted by alkoxy of 1 to 5 carbon atoms.

2. A dibenzo[a,d]cycloheptatriene according to claim 1 of the formula:

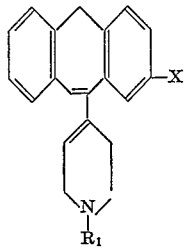

and its therapeutically acceptable acid addition salts, in which X represents hydrogen, halogen, alkoxy of 1 to 5 carbon atoms, or alkylthio of 1 to 5 carbon atoms, and $R_1$ represents alkyl of 1 to 5 carbon atoms or benzyl, the phenyl nucleus of which is unsubstituted, or substituted by alkoxy of 1 to 5 carbon atoms.

3. A dibenzo[a,d]cycloheptatriene according to claim 2 and its therapeutically acceptable acid addition salts, in which X represents hydrogen, chlorine, bromine, or alkylthio of 1 to 5 carbon atoms, and $R_1$ represents methyl, benzyl, or 4-alkoxybenzyl of 1 to 5 carbon atoms in the alkoxy residue.

4. A dibenzo[a,d]cycloheptatriene according to claim 1 which is 2-chloro-11-(1-methyl-1,2,3,6-tetrahydro-4-pyridyl)dibenzo[a,d]cycloheptatriene and its therapeutically acceptable acid addition salts.

5. A dibenzo[a,d]cycloheptatriene according to claim 1 which is 10-[1-(4-methoxybenzyl)-1,2,3,6-tetrahydro-4-pyridyl]-dibenzo[a,d]cycloheptatriene and its therapeutically acceptable acid addition salts.

6. A dibenzo[a,d]cycloheptatriene according to claim 1 which is 2-methylthio-11-(1-methyl-1,2,3,6-tetrahydro-4-pyridyl)-dibenzo[a,d]cycloheptatriene and its therapeutically acceptable acid addition salts.

7. A dibenzo[a,d]cycloheptatriene according to claim 1 which is 2-bromo-11-(1-methyl-1,2,3,6-tetrahydro-4-pyridyl)dibenzo[a,d]cycloheptatriene and its therapeutically acceptable acid addition salts.

8. A dibenzo[a,d]cycloheptatriene according to claim 1 which is 2-chloro-11-(1-benzyl-1,2,3,6-tetrahydro-4-pyridyl)dibenzo[a,d]cycloheptatriene and its therapeutically acceptable acid addition salts.

References Cited
UNITED STATES PATENTS
2,985,660   5/1961   Judd et al. _____ 260—293

OTHER REFERENCES
Burger, Medicinal Chemistry, Interscience, 2nd edition, p. 497), (1960), RS 403, B-8.

HENRY R. JILES, Primary Examiner
A. L. ROTMAN, Assistant Examiner

U.S. Cl. X.R.
260—253, 290, 294.8, 295, 296, 297, 465, 470, 516, 517, 521, 590, 609, 611, 618; 424—263, 266